Aug. 25, 1925.
I. E. COLEMAN
1,550,949
ELECTRIC TOASTER
Filed Dec. 11, 1924   2 Sheets-Sheet 1
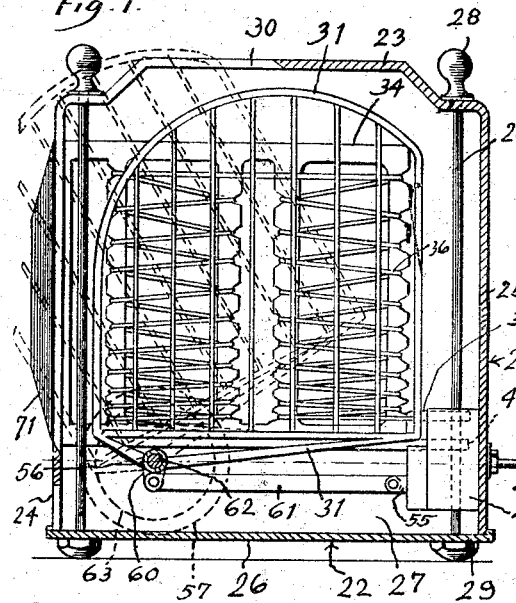
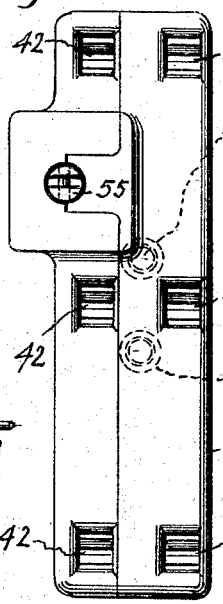
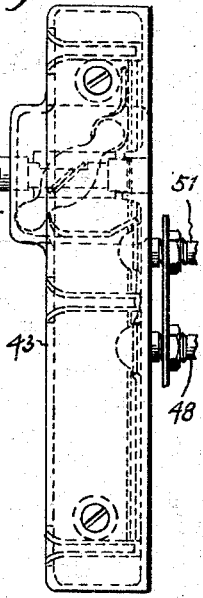
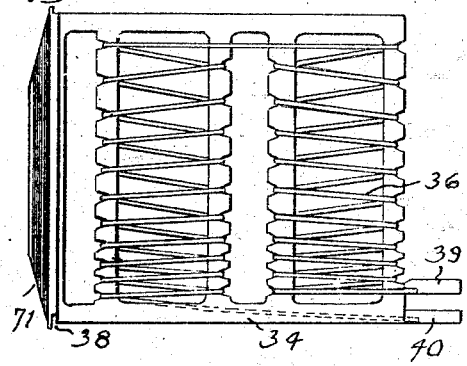
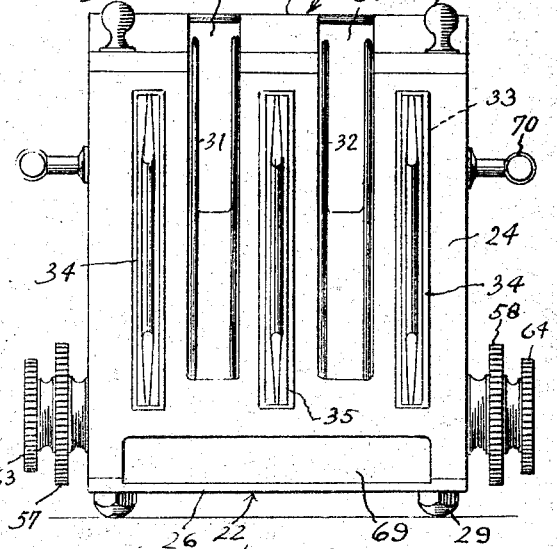
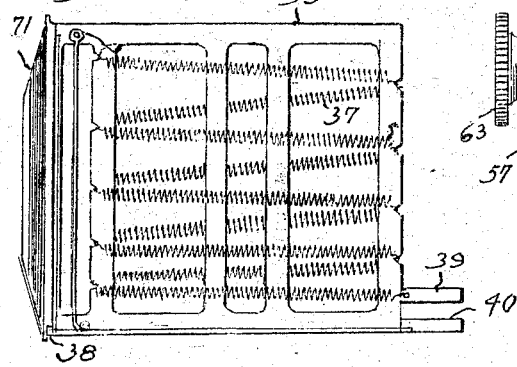
INVENTOR:
IRVING E. COLEMAN
By Atty.
Frederic M. Keeney

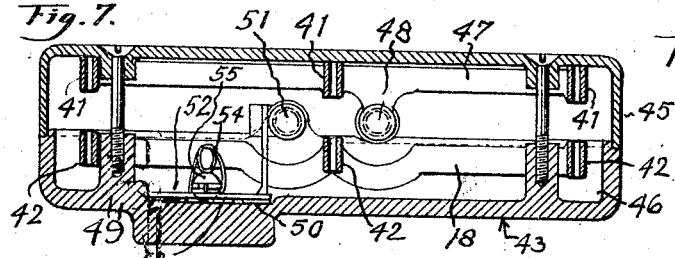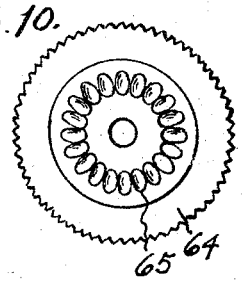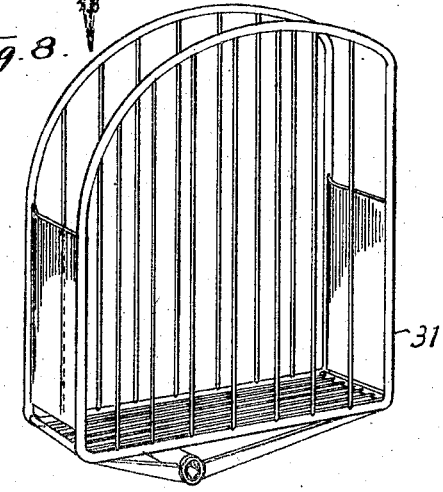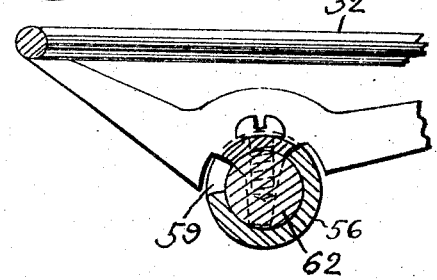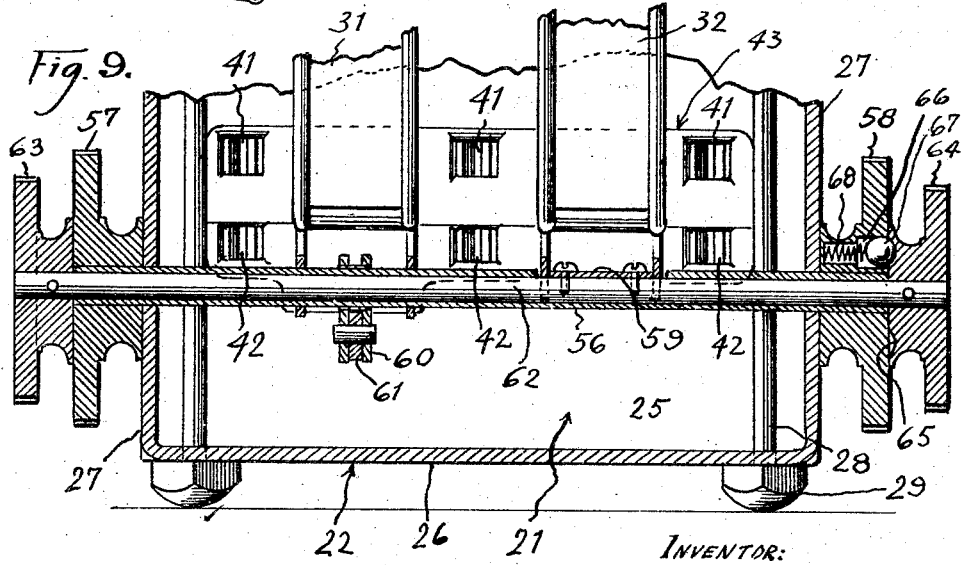

Patented Aug. 25, 1925.

1,550,949

UNITED STATES PATENT OFFICE.

IRVING E. COLEMAN, OF LOS ANGELES, CALIFORNIA.

ELECTRIC TOASTER.

Application filed December 11, 1924. Serial No. 755,262.

*To all whom it may concern:*

Be it known that I, IRVING E. COLEMAN, a citizen of the United States, residing in the city and county of Los Angeles and State of California, have invented a new and useful Electric Toaster, of which the following is a specification.

This invention relates to improvements in electric toasters, and its objects are to provide a device of this character, which may be more conveniently manipulated by the operator, and to provide a toaster which will accomplish the toasting process with a more economical consumption of current.

Another object is to provide a toaster adapted for toasting two slices of bread simultaneously, and tiltable holders for the slices, and means for actuating the holders simultaneously to open position, or for actuating one of them independently, for inspection and removal of the bread.

Another object of the present invention is to provide a mechanism for automatically shutting off the electric current when the slice holders are turned to their open position.

Another object is to provide a toaster, which, in its open position, occupies but little more space than in its closed position, and to provide a toaster having an integral crumb tray beneath the slice holders so arranged as to be readily cleaned by the operator.

Another object is to provide a toaster in which the heating elements are readily removable, so that an unskilled person may easily remove and replace a burned out heating element.

Other objects and advantages may appear in the subjoined detail description.

In the drawings: Figure 1 is a vertical and transverse elevation of a toaster embodying the principles of the present invention. Fig. 2 is a side and detail view of an electric heating grid detached from the housing. Fig. 3 is a side and detail view of the central heating grid. Fig. 4 is a front view of the switch box. Fig. 5 is a top plan view of the switch box detached from the housing. Fig. 6 is a front elevation of the device. Fig. 7 is a longitudinal and sectional view of the switch box. Fig. 8 is a perspective detail view of the slice holder. Fig. 9 is a fragmentary view of the housing, showing the slice holder tilting means in section. Fig. 10 is an end view of a turning knob showing the ratchet teeth thereon. Fig. 11 is a sectional detail view of the tilting shaft and sleeve.

Referring to the drawings, the housing consists of two portions 21 and 22. The section 21 includes the top 23, front 24, and back 25. The section 22 includes the bottom 26 and end walls 27. Bolts 28 extend through the top and bottom walls, and at the bottom are provided with nuts 29, for securing the sections together to form the housing. The top and front walls are provided with slots 30 through which the tiltable slice holders 31 and 32 project, when titled to their inoperative or non-toasting position. The front walls is further provided with a series of slots 33, in which are inserted the electric heating grids 34 and 35. The outer grids 34 are each provided with a flat wire 36, forming the heating element. The central grid 35, is provided with a fine coiled wire 37, which forms the heating element. Each grid is provided with a notch 38, at the bottom thereof, adapted to engage with the edge of the slot for the purpose of retaining the grid in position. The grids are further held by friction within said slots, and by the contact plungers 39 and 40 which are adapted to engage with corresponding sockets 41 and 42, in the switch box 43.

Each grid is provided with a handle 71, by which it may be removed from the housing.

The switch box 43 consists of an upper portion 45 and a lower portion 46. The portion 45 contains the sockets 41, which are connected to a bar 47, in turn connected to a terminal 48, adapted to extend without the housing. The lower portion 46 contains sockets 42, connected by a bar 18, which in turn is connected to a switch contact member 49. The switch contact member 50 is connected to a terminal 51, adapted to extend without the housing. The switch 52, is of the "push-through" style of electric switch, in which the bridging element 53 is actuated by a spring 54, upon movement of a plunger 55.

A tubular shaft 56 is journalled in the housing, and has thereon the turning handles 57 and 58. The shaft 56 is provided with a slot 59, and with a short lever 60. A link 61, connects lever 60 and the switch plunger 55. The slice holder 31 is fixed to the tubular shaft 56. The slice holder 32 is fixed to a shaft 62, extending concentrically in tubular shaft 56. Turning handles 63 and 64 are mounted on shaft 62. The turning handle 64 is provided with ratchet teeth 65, and the handle 58 is provided with a socket 66, in which is mounted a ball ratchet member 67, actuated by a spring 68, and adapted to engage with ratchet teeth 65, which allows the inner shaft 62 to be turned independently relative to tubular shaft 56, and to allow the slice holder 32 to remain in its inoperative or non-toasting position relative to the remaining slice holder mounted on the tubular shaft 56. The arrangement of the slot in the tubular shaft is such that upon manually actuating the tubular shaft, both slice holders may be operated to operative and to inoperative positions.

It may be noted that the housing is provided with an opening 69 in the front wall thereof. Through this opening the crumbs may be removed from time to time. The housing is further provided with handles 70, to facilitate the handling thereof.

The housing is preferably made of sheet metal. The switchbox is preferably made of an insulating material, such as porcelain, or "bakelite", and the other electrical elements are made from suitable metals and materials.

From the foregoing description and drawings, it may be seen that I have provided an efficient toaster. The slice holders are tiltable to a non-toasting position, and when in this position, the slices of bread to be toasted may be inserted, inspected, or removed. In the toasting position, the slice holders are unbalanced, and therefore tend to remain in this position. When tilted to non-toasting position, the slice holders are retained in position, through connection with the "push-through" electric switch. One slice holder is tiltable to the non-toasting position independently of the other, and therefore, it may be turned to inoperative position for inspection of the slice of bread while the other holder remains in toasting position.

The heating grids are detachable and interchangeable, and therefore, should a burn-out occur, one may be removed and replaced by a new grid in a moment's time.

An important feature of the invention is the automatic actuation of the switch to cut off the current, upon tilting the slice holders to the non-toasting position, and another feature is the provision of means for collecting the crumbs and the removal of the same.

What is claimed is:

1. In an electric toaster, the combination with a housing having transverse slots therein, of electric heating elements mounted in the housing and between said slots, tiltable slice holders mounted in the housing and disposed in said slots, an electric box including a switch mounted in the rear portion of the housing and including a series of sockets, plungers on the heating elements adapted to engage with said sockets in the electric box, and a lever integral with one of the tiltable slice holders adapted to actuate the switch to closed position when the slice holders are actuated to their closed position.

2. An electric toaster comprising a housing having transverse slots therein, tiltable slice holders mounted in the housing and disposed in said slots, switch elements at the rear portion of the housing, heating elements controlled by the switch elements, and means whereby the movement of the tiltable slice holders actuates the switch elements.

3. An electric toaster comprising a housing having a series of transverse slots in the upper part thereof, tiltable slice holders mounted in the housing and disposed in said slots, means for manually tilting the slice holders, electric heating elements mounted in the housing and disposed between the tiltable slice holders, switch elements mounted in the housing and serving to control the current to the heating elements, and a lever projecting from one of the tiltable holders and arranged to actuate the switch elements.

4. In an electric toaster, tiltable slice holders, means for manually operating the slice holders to operative and inoperative positions, heating elements adjacent to the slice holders, and a switch actuated by the movement of the slice holders, and serving to control the current to the heating elements.

5. In an electric toaster, a housing, tiltable slice holders mounted therein and tiltable from operative position to an inoperative position, electric heating grids mounted in the housing and adjacent to the tiltable slice holders, said slice holders being normally within the housing in their operative position, and means for deenergizing the grids when the slice holders are tilted to their inoperative position.

6. In an electric toaster, the combination with a housing, of tiltable slice holders mounted in the housing and projecting from the housing in their inoperative position, means for manually actuating the slice holders to their operative and inoperative positions, electric heating grids mounted within the housing and disposed adjacent to the slice holders, an electric circuit in connection with the grids and serving to energize the same, and a switch to control the electric circuit and operated to open position by the movement of the slice holders to their inoperative position, and operated to closed position upon the movement of the slice holders to their operative position.

7. In an electric toaster, the combination with a housing having a front wall provided with vertical slots, and having a rear wall, of a switch box mounted in the housing and on the rear wall thereof, said switch box including socket terminals, and a switch to open and close the circuit for the socket terminals, electric heating grids mounted in the slots in the front walls of the housing, plunger contact elements mounted on the grids and adapted to engage with the socket terminals, tiltable slice holders mounted in the housing and operable to an operative position and inoperative position, means for manually actuating the slice holders, and means for automatically actuating the switch to open and closed position in accordance with the position of the slice holders.

8. In an electric toaster, the combination with a housing and tiltable slice holders mounted therein, and means for manually actuating the slice holders to operative and inoperative positions, of electric heating grids detachably mounted in the housing, means for energizing the grids, and means for deenergizing the grids upon movement of the slice holders to their inoperative position.

9. In an electric toaster, the combination with a housing and tiltable slice holders mounted therein and adapted to extend from the housing in their inoperative position, of means for manually actuating one of the slice holders to its inoperative position independently, and means for actuating both slice holders to their inoperative position simultaneously.

10. In an electric toaster, the combination with a housing having slots in the walls thereof and tiltable slice holders mounted in the housing and adapted to extend in the slots in their inoperative position, of means for manually actuating the slice holders to their inoperative position, simultaneously and means for manually actuating one of the slice holders independently to its inoperative position.

11. In an electric toaster, the combination with a housing having slots in the walls thereof and tiltable slice holders mounted in the housing and adapted to extend in the slots in their inoperative position, of means for manually actuating the slice holders to their inoperative position simultaneously, means for manually actuating one of the slice holders to its inoperative position, electric heating grids mounted in the housing and adjacent to the slice holders, means for energizing the grids, and means for cutting off the grid energizing means when both slice holders are actuated to their inoperative position.

12. In an electric toaster, the combination with a housing having a series of apertures in the walls thereof, of a shaft journalled in the end walls of the housing, a sleeve rotatably mounted on the shaft, a tiltable slice holder mounted on the rotatable shaft, another tiltable slice holder mounted on the rotatable sleeve, turning handles arranged to operate the shaft, other handles arranged for manually operating the sleeve, a lever mounted on the sleeve, a switch box at the rear portion of the housing, a switch included in the switch box, a link connecting the lever and the switch, electric heating grids mounted in the housing and adjacent to the tiltable slice holders, and in engagement with the switch box, a spring element mounted on the sleeve and engaging with the shaft for synchronous rotation of the shaft and sleeve when the sleeve is manually operated, and electric contact terminals extending from the switch box and from the housing, said switch serving to open and close the circuit for energizing the heating grids.

13. In an electric toaster, the combination with a housing having a series of apertures in the walls thereof, of a shaft journalled therein, handles for manually rotating the shaft, a sleeve rotatably mounted on the shaft, handles for manually rotating the sleeve, means normally serving to prevent rotation of the sleeve when the shaft is operated, means for forcing synchronous rotation of the shaft when the sleeve is manually operated, a tiltable slice holder mounted on the shaft, a tiltable slice holder mounted on the sleeve, electric heating grids mounted in the housing and disposed adjacent to the tiltable slice holders, said slice holders projecting through said slots in the housing when tilted from their normal position, an electric circuit for the heating grids, and a switch arranged to open and close the circuit, and operated by the movement of the slice holders when tilted from their normal position.

14. In an electric toaster, a housing, a tubular shaft journalled in the housing, an inner shaft extending through the tubular shaft, said tubular shaft having a longitudinal slot therein, a tiltable slice holder fixed to the tubular shaft, another tiltable slice holder fixed to the inner shaft and connected thereto through said slot, handles for turning the tubular shaft, handles for turning the inner shaft, and a ratchet mechanism between the handles of the tubular shaft and inner shaft.

15. In an electric toaster, a housing, tiltable slice holders mounted therein, heating elements adjacent to the slice holders, means for manually tilting one of the slice holders independently, means for manually tilting both slice holders simultaneously, and means for de-energizing the heating elements when both slice holders are actuated to their inoperative position.

16. In an electric toaster, a switch box having a series of sockets arranged for an electrical contact, said sockets being arranged in rows one above the other, means for constantly energizing the upper row of sockets, a switch controlling the lowermost row of sockets, heating grids including plungers adapted to engage with said series of sockets, tiltable slice holders interposed between the heating grids, and adapted to be actuated from toasting to non-toasting position, means for manually actuating the slice holders to their non-toasting position, and means for throwing the switch to open position when the slice holders are turned to their non-toasting position.

17. In an electric toaster, the combination with a housing, of tiltable slice holders mounted therein, detachable heating grids interposed between the slice holders, means for energizing the grids in the toasting position of the slice holders, and means for cutting off the energizing means operative upon movement of the slice holders to non-toasting position.

18. The combination with a housing, of tiltable slice holders mounted therein, means for manually actuating the slice holders to toasting and non-toasting positions, electric heating means associated with the slice holders, electric terminals extending from the housing, and a switch interposed between the terminals and the heating means, and adapted to be actuated to open position on movement of the slice holders to non-toasting position, and to be actuated to closed position on movement of the slice holders to toasting position.

In testimony whereof, I hereunto affix my signature.

IRVING E. COLEMAN.